United States Patent
Mancosu et al.

(10) Patent No.: US 7,261,530 B2
(45) Date of Patent: Aug. 28, 2007

(54) CONTROLLED VOLUME DEVICE AND METHOD FOR MOULDING AND VULCANIZING A TIRE

(75) Inventors: Federico Mancosu, Milan (IT); Anna Paola Fioravanti, Monza (IT); Pierangelo Misani, Monza (IT)

(73) Assignee: Pirelli Pneumatici S.p.A., Milan (IT)

( * ) Notice: Subject to any disclaimer, the term of this patent is extended or adjusted under 35 U.S.C. 154(b) by 307 days.

(21) Appl. No.: 10/475,359

(22) PCT Filed: Apr. 24, 2002

(86) PCT No.: PCT/EP02/04488

§ 371 (c)(1),
(2), (4) Date: Mar. 19, 2004

(87) PCT Pub. No.: WO02/087863

PCT Pub. Date: Nov. 7, 2002

(65) Prior Publication Data

US 2004/0145083 A1 Jul. 29, 2004

Related U.S. Application Data

(60) Provisional application No. 60/298,882, filed on Jun. 19, 2001.

(30) Foreign Application Priority Data

Apr. 30, 2001 (EP) .................................. 01830282

(51) Int. Cl.
*B29C 35/02* (2006.01)
(52) U.S. Cl. .......................................... 425/43; 425/51
(58) Field of Classification Search ................. 425/43, 425/51
See application file for complete search history.

(56) References Cited

U.S. PATENT DOCUMENTS

| 1,328,676 | A | * | 1/1920 | Krannich | 425/51 |
| 1,366,750 | A | * | 1/1921 | Smith et al. | 425/51 |
| 1,371,775 | A |   | 3/1921 | Cox |  |
| 1,373,389 | A | * | 3/1921 | Witsaman | 425/43 |

(Continued)

FOREIGN PATENT DOCUMENTS

EP 0 264 600 A1 4/1927

(Continued)

*Primary Examiner*—James P. Mackey
(74) *Attorney, Agent, or Firm*—Finnegan, Henderson, Farabow, Garrett & Dunner, L.L.P.

(57) ABSTRACT

A device for molding and vulcanizing a tire includes an outer shell, collapsible inner support, and movable crown. The movable crown is interposed between the outer shell and inner support. The movable crown and outer shell form a cavity of controlled volume for moulding and vulcanizing, wherein the controlled volume of the cavity fits a defined volume of the tire so that the moulding pressure is maintained within a predetermined range of values. A method of moulding and vulcanizing a tire includes preparing a tire on an inner toroidal support, disposing the tire and the toroidal support in an outer shell, and molding and vulcanizing the tire. Molding and vulcanizing are carried out in a controlled-volume cavity, wherein a volume of the controlled-volume cavity increases or decreases to adapt to a volume of the tire so that the volume of the controlled-volume cavity equals the defined volume of the tire.

11 Claims, 4 Drawing Sheets

U.S. PATENT DOCUMENTS

| | | | |
|---|---|---|---|
| 1,393,998 A | | 10/1921 | Fulton |
| 1,407,839 A | * | 2/1922 | Clinefelter et al. ............ 425/43 |
| 1,466,366 A | * | 8/1923 | Lehmann ...................... 425/51 |
| 1,605,235 A | * | 11/1926 | Huetter ........................ 425/51 |
| 1,620,435 A | * | 3/1927 | Burdette ...................... 425/43 |
| 1,840,489 A | * | 1/1932 | Denmire ....................... 425/43 |
| 1,879,348 A | * | 9/1932 | Lawson ........................ 425/51 |
| 2,561,573 A | * | 7/1951 | Hovlid et al. ................. 425/43 |
| 3,167,818 A | * | 2/1965 | Ross .............................. 45/43 |
| 5,851,557 A | | 12/1998 | Pouille et al. |
| 6,332,999 B1 | * | 12/2001 | Caretta ........................ 425/44 |

FOREIGN PATENT DOCUMENTS

| | | |
|---|---|---|
| EP | 0 400 496 A1 | 12/1990 |
| EP | 0 983 834 A1 | 3/2000 |
| GB | 121439 | 12/1918 |

* cited by examiner

CONTROLLED VOLUME DEVICE AND METHOD FOR MOULDING AND VULCANIZING A TIRE

CROSS REFERENCE TO RELATED APPLICATIONS

This application is an national phase application based on PCT/EP02/04488, filed Apr. 24, 2002, the content of which is incorporated herein by reference, and claims the benefit of U.S. Provisional Application No. 60/298,882, filed Jun. 19, 2001, the content of which is incorporated herein by reference, and claims the right to priority based on European Application No. 01830282.8, filed Apr. 30, 2001, the content of which is incorporated herein by reference.

BACKGROUND OF THE INVENTION

1. Field of the Invention

The present invention relates to a device and a method for moulding and vulcanizing a tyre, said moulding and vulcanizing operations being carried out at controlled volume.

2. Description of the Related Art

Traditionally, tyre manufacture involves the preparation, on a drum, of a green product consisting of a toroidal sleeve comprising a carcass that has a crown zone inserted between a pair of axially-opposed sidewalls, ending in beads for anchoring the tyre to a corresponding assembling rim, a belt structure and a tread band. The carcass and the belt structure are formed from preselected elastomeric materials and reinforcing elements, the tread band and the sidewalls are formed from strips of elastomeric material.

Then, the green tyre is extracted from the drum and submitted to vulcanization in a mould, under the combined action of heat and pressure.

Generally, the vulcanizing mould comprises a crown of radially adjustable sectors, interposed between two axially-opposed, mirror-finish cheeks, and an inflatable internal elastic chamber. Inside the mould, the green tyre is heated simultaneously from the outside and from the inside by means of a fluid under pressure (typically steam or hot water) circulating in the mould and introduced into the internal elastic chamber. During mould closure the cheeks are axially brought closer each other and the sectors are moved centripetally, to generate an outwardly closed cavity. During vulcanization, the elastic chamber expands and compresses the tyre from the inside against the mould. The tyre thus acquires the final tread pattern and the final shape.

During this moulding and vulcanization process, any variations of volume and/or of thickness of the green tyre can be tolerated because the internal elastic chamber, being deformable, automatically adapts itself to said variations and can "make adjustments" for them.

More recently, this traditional technique has been supplemented with a tyre moulding and vulcanization technique with a constant-volume mould. This consists of placing a predetermined volume of reinforcing elements and elastomeric material, which constitute the green tyre that is to be built and vulcanized, onto a rigid support of a toroidal shape (with outside surface matched to the inside surface of the finished tyre). The vulcanizing mould has an outer shell formed of a crown of sectors and of cheeks, and an inner part formed of the rigid support carrying the green tyre. When the mould is closed, the outer part of the mould is in its stop position and between said position and the rigid support there is the formation of a hollow space whose volume always remains constant.

The green tyre that is to be moulded and vulcanized in said mould must have a similar shape to that of the hollow space and a volume substantially equal to said constant volume of the hollow space of the mould because the moulding pressure depends on the difference between the volume of the green tyre and the volume of the hollow space. If the volume of the green tyre is less than that of the hollow space, the value of the moulding pressure is insufficient and hence the final result is unsatisfactory. On the other hand, in the case of excessive volume of the green tyre (in view of the constant volume available inside the mould and of the incompressibility of the rubber), high pressures are generated inside the mould. Said high pressures can generate excessive stresses on the mechanical components of the mould and lead to the deformation of the mould and hence to the production of a "distorted" product, or to the formation of unacceptable fins, if the elastomeric material flows into the clearances between said mechanical components and/or into suitable vents provided in the mould, or even to mould breakage.

Therefore, in moulding at constant volume, the volume of the green tyre should be substantially equal to the free volume of the closed mould. In practice, the volume of the green tyre must be just slightly greater than that of the hollow space in which it is accommodated.

EP-A0 264 600 describes a method and an equipment for moulding and vulcanizing a pneumatic tyre, at constant volume, in which elastomeric products and reinforcing elements are placed, in succession, on a rigid support, so that a green tyre is built up progressively. Placing of the elastomeric products is effected by means of at least one volumetric extruder having a discharge orifice positioned, relative to the support, in a lane in which the elastomeric product is applied for making the green tyre. The quantity of elastomeric product deposited is controlled by extruding a given volume from the volumetric extruder in relation to the speed of rotation of the support and to the deposition radius. The profile of the elastomeric product to be produced is obtained by means of a substantially meridian movement of the orifice relative to the rotating deposition surface.

The method and the equipment described in this document employ a mould in which the inside is constituted of a rigid support on which the green tyre is built. Thus, it is a constant-volume mould.

Therefore, in this case too, the method and the equipment described in the above-mentioned document require a green tyre that is to be moulded and vulcanized with a volume as constant as possible, and as close as possible to the theoretical (nominal) volume of the hollow space of the closed mould.

However, because of the inevitable variations of an industrial process, the quantity of elastomeric compound delivered is liable to fluctuations and the volume of the green tyres is not constant, whereas the volume of the hollow space of the mould is constant. Therefore, if there is a shortage of the elastomeric compound, constancy and correct moulding pressure are not guaranteed, whereas if there is excess of the elastomeric compound there are the problems and the difficulties described above.

Moreover, the above-mentioned variations in volume of the delivered material may depend, as well as on purely mechanical causes, also on the various characteristics of the elastomeric material and/or of the additives from one supplier to another or from batch to batch and/or on the process for mixing the components of the elastomeric compouds.

EP-A-0 400 496 describes a volumetric pump for the delivery of green rubber for an apparatus for moulding and vulcanizing a tyre, at constant volume. The pump comprises at least one delivery piston sliding in a cylinder with alternating motion between a top dead point and a bottom dead point. The pump also comprises a feed chamber, means for forced feed for feeding said cylinder and a discharge opening provided with a non-return valve. The cylinder wall comprises, as sole communication of the cylinder with the exterior, one or more inlet ports in which the feed chamber ends. The inlet port is arranged axially between the top dead point and the bottom dead point and is closed by the delivery piston during its movement towards the top dead point. The volume extruded in one cycle of the pump depends on the volume swept by the delivery piston between the point at which it closes the inlet port and the top dead point and by the fact that the feeding means and said delivery piston are actuated by a single input shaft.

This is a very complex pump which, however, does not guarantee deliveries of perfectly constant volumes.

The inventors observed that, in practice, in the process of building of a green tyre there is always a variation in the mass of materials delivered equal to $\pm\delta_{mass}$ and hence a variability in the volume of the green tyre equal to $\pm\delta_{volume}$ relative to the nominal volume $V_0$. For example, if $\pm\delta_{mass}$ is of the order of $\pm 100$ g, assuming a specific density of 1.1 g/cm$^3$, $\pm\delta_{volume}$ is equal to $\pm 91$ cm$^3$. The variability of tyre volume, in percentage terms, is $\pm 1\%$.

This value is, however, unacceptable for modem, sophisticated tyres intended for equipping high-performance cars.

SUMMARY OF THE INVENTION

The aims of the invention are a device and a method for the moulding and vulcanization of a green tyre that offer the advantages of the constant-volume moulding technique but avoid its drawbacks.

This is achieved by working at strictly controlled volume.

In the present description and in the claims that follow, the expression "controlled volume" signifies that the volume of the moulding and vulcanization cavity increases or decreases to fit to the volume of the green tyre contained in said cavity. In that way, the volume of said cavity is always equal to that of the green tyre and this obviates the drawbacks due to the "variations" of the industrial process that were described earlier.

In a first aspect, the invention relates to a device for the moulding and vulcanization, in predetermined conditions of temperature and pressure, of a tyre that is at least partially green, having a defined volume, said device comprising an outer shell and a collapsible inner support, characterized in that said device also comprises a movable crown interposed between said inner support and said outer shell, said movable crown forming with said outer shell a cavity of controlled volume for the moulding and vulcanization of said tyre, the volume of said cavity adapting to the volume of the tyre it contains, so that said moulding pressure is maintained within a predetermined range of values.

In a preferred embodiment, said inner support is of toroidal shape and comprises a plurality of convex circumferential sectors, each of said convex sectors comprising a base portion, radially internal, suitable to define the axially internal surface of the sidewalls of said tyre, said base portion being associated with a portion of said crown, radially external, suitable to define the radially internal surface of said tyre, said portion of said crown being movable in both directions, radially to said base portion.

Advantageously, said crown portion is connected to the base portion so as to allow their relative movement in the radial direction.

In one embodiment, said crown portion is associated with each convex circumferential sector with elastic elements being interposed, which make it elastically movable.

Advantageously, said crown portion has a radially external profile matched to the internal surface of the crown of said tyre.

Typically, said crown portion is provided with at least two stops that engage in grooves of said base portion to oppose/balance the forces due to any preloading of said elastic elements.

Preferably, a supporting structure is provided in which suitable profiles have been made, which function both as guide for said elastic means, and as lower stop for said crown portion.

Advantageously, said crown portion is connected to said base portion by means of at least one pin that is provided with a threaded end and with a head that functions as upper stop for said crown portion and allows controllable preloading of said elastic elements.

Preferably, said elastic elements are disk springs.

Advantageously, said supporting structure is connected to internal cheeks in such a way as to allow their relative movement in the axial direction.

Preferably, at the contact between two contiguous crown portions there is an insert of elastomeric material or similar, glued to one of the two opposite surfaces of said two contiguous crown portions.

Even more preferably, also at the contact between two contiguous base portions, there is an insert of elastomeric material or similar, glued to one of the two opposite surfaces of said two contiguous base portions.

In a second aspect, the invention relates to a method for moulding and vulcanizing a tyre comprising:

a) preparing a green tyre, having a defined volume, formed from preselected elastomeric materials and reinforcing elements, on a toroidal internal support, b) positioning said green tyre and the respective toroidal internal support in an external shell, and c) moulding and vulcanizing said tyre, characterized in that d) said moulding and vulcanizing are carried out in a cavity at controlled volume, whose volume increases or decreases to fit to the volume of said green tyre it contains, in such a way that the volume of said cavity is always equal to that of the green tyre.

Advantageously, the aforesaid method Is carried out with the device of the present invention previously described.

The device and the method of the Invention make it possible to adjust the volume of the cavity for moulding and vulcanization to the effective volume of the green tyre, while maintaining the moulding pressure within the useful range of values for moulding as the volume of the green tyre varies within predetermined tolerances of the tyre building process.

Said device and method have the advantage of guaranteeing attainment of the minimum moulding pressure, of maintaining said moulding pressure within the useful range of values while avoiding mould deformation or breakage, and of eliminating defects in the finished tyre.

A further advantage offered by the device and the method of the invention is the vulcanization without steam, in that mould heating can be provided by the Joule effect by means of special devices that are not described herein as they are well known.

BRIEF DESCRIPTION OF THE DRAWINGS

Characteristics and advantages of the invention will now be illustrated referring to embodiments shown by way of a non-limiting example, in the accompanying drawings, in which.

DETAILED DESCRIPTION OF THE EXEMPLARY EMBODIMENTS

Figure 1:
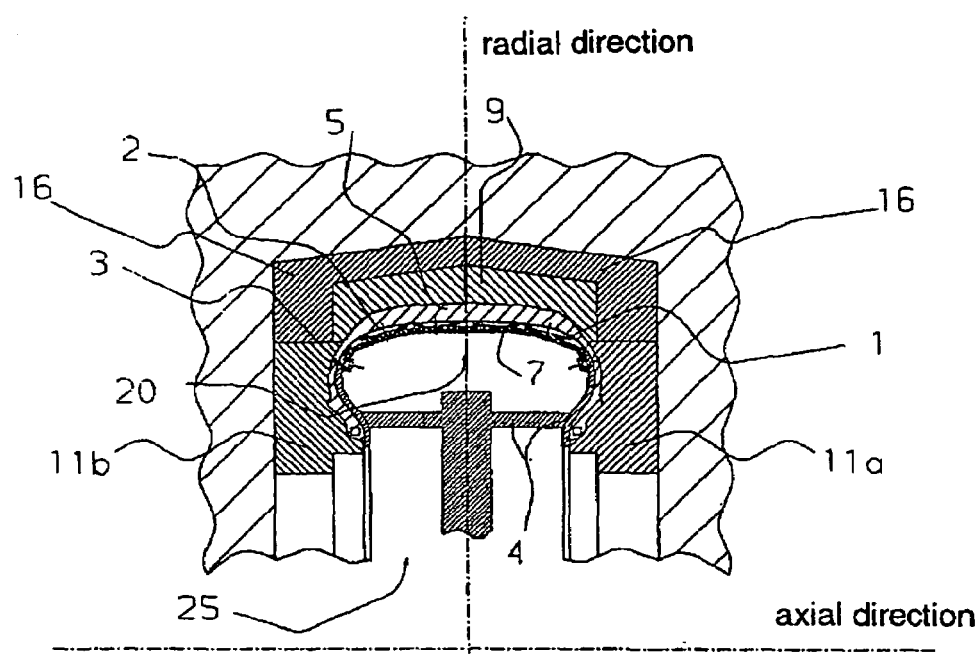
FIG. 1 is a partial view of the meridian section of a device for the controlled-volume moulding and vulcanization of a green tyre according to the invention.

FIG. 1 shows a device 10, for controlled-volume moulding and vulcanization, in predetermined conditions of temperature and pressure, of a tyre 5 that is at least partially green. Said device 10 includes:
an outer shell comprising:
- a pair of coaxial annular cheeks 11a and 11b, axially opposed and movable relative to one another until mould closure, suitable to operate in correspondence of the sidewalls of the tyre 5,
- a plurality of concave circumferential sectors 9, axially interposed between said cheeks 11a and 11b, suitable to operate in correspondence of the tread band of said tyre 5 and movable radially in both directions until mould closure,
- two halves 16 subject to the movement of the circumferential sectors 9, an internal toroidal support, the meridian semi-section of which is shown in detail in FIG. 2, that comprises a plurality of convex circumferential sectors 25, each of which includes
- a base portion 4, radially internal, suitable to define the axially internal surface of the sidewalls of said tyre 5,
- a crown cap 20, radially external, suitable to define the radially internal surface of the crown of said tyre 5, said cap 20 including:
  - a supporting structure 7, radially internal, made integral with base portion 4 by means of gripping screws 3,
  - a crown portion (movable part) 2 radially external (either flexible or rigid) movable in both radial directions relative to said parts 7 and 4, owing to the yielding of elastic means 1 radially interposed between parts 7 and 2.

In the supporting structure 7 (see FIG. 2), suitable shapes 8 are made, which function both as guide for the elastic means 1, and as lower stop for the crown portion (movable part) 2, for the purpose of protecting said elastic means from excessive strains.

The crown portion (movable part) 2 is provided at the ends with stops 6, which slide between the cavities/grooves 12 (see FIG. 2) made between the supporting structure 7 and the base portion 4.

Figure 2:
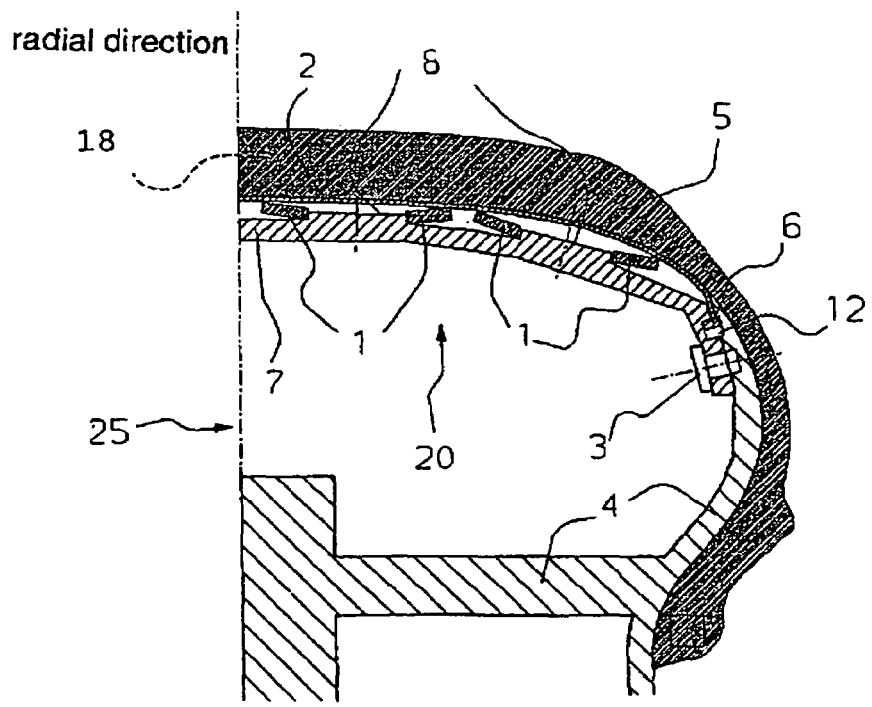
FIG. 2 is a partial view, in meridian section along line BB of FIG. 5 described later, of the green tyre and of the collapsible internal support, made according to the invention, of the device of FIG. 1.

In the stage of preparation of the green tyre the configuration is that shown in FIG. 2, with the elastic means 1 preloaded to an optimum value selected by the designer as a function of the process, and with the stop 6 up against the upper side of cavity 12 which opposes and balances the preload.

The preload of the elastic means and the external profile of the crown portion (movable part) 2 are selected in such a way that the external profile of drum 25 during the stage of building of the green tyre 5 (which will be indicated hereinafter as the nominal position) should remain unchanged in the moulding/vulcanization stage yet guaranteeing sufficient moulding pressure, when the volume of the green tyre 5 is at the lower extreme of the tolerance (i.e. $V=V_{min}=V_0-\delta_{volume}$, where $V_0$ is typically of the order of 10000 cm$^3$, and the tolerance $\delta_{volume}$ is of the order of 100 cm$^3$).

Figure 3:
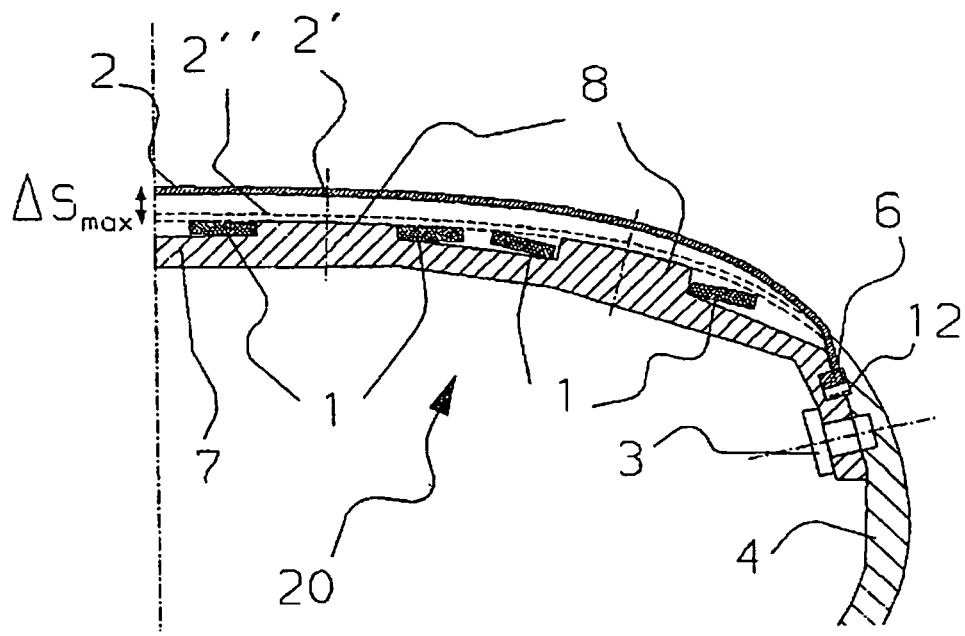
FIG. 3 is a partial view, in meridian section along line BB of FIG. 5 described later, of the internal support of the device of FIG. 1, showing the two positions of lower stop (full line) and upper stop (dashed line) assumed by the crown portion.

During the moulding stage, the crown portion (movable part) 2 can move, adapting the volume of the cavity 18 between the outer shell, composed of the cheeks 11 and of the concave sectors 9, and the internal support 25 of device 10, to the volume of the green tyre (variable within the process tolerance), In more detail:
when the volume of the green tyre $V=V_{min}=V_0-\delta_{volume}$: the moment of mould closure, the force of contact between the stop 6 and the upper side of the cavity/groove 12 decreases progressively until it reaches zero, the crown portion (movable part) 2 does not move from the nominal position 2' in FIG. 3, and the preload of the elastic means 1 guarantees the desired moulding pressure that ranges for example from 2.0 to 3.5 MPa and is, typically, 2.5-3.0 MPa;

when the volume of the green tyre $V=V_{max}=V_0+\delta_{volume}$: the crown portion (movable part) 2, at the moment of mould closure, moves from the nominal position 2' to the lower stop position, shown by a dashed line and indicated with 2" in FIG. 3, in which the profiles 8 prevent the crown portion (movable part) 2 from descending further, to protect both the elastic means 1 and the final shape of the finished tyre. This movement is due to the fact that an excess of volume of the green tyre 5 tends to increase the pressure acting on the crown portion (movable part) 2, and as a consequence the elastic means 1 yield by $\Delta s$, increasing by $\Delta s$ per the external surface area of part 2 the volume of cavity 18 available for the green tyre 5 during vulcanization/moulding;

when the volume V of the green tyre is between $V_{min}$ and $V_{max}$: the crown portion (movable part) 2, at the moment of mould closure, moves to a position intermediate between the nominal position 2' and the lower stop position 2" (see FIG. 3).

Figure 4:
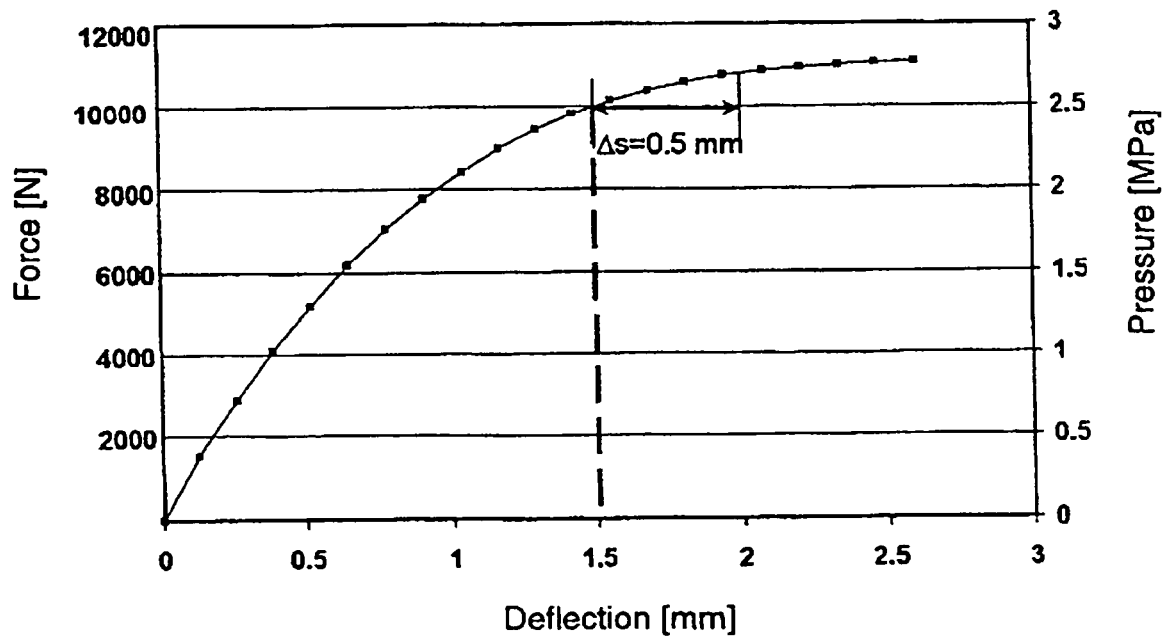
FIG. 4 is a graph showing a characteristic curve of springs present in the collapsible internal support in FIGS. 1-3.

In the example illustrated, said elastic means 1 are made up of suitable arrangements of disk springs, preferably having a "softening" characteristic of the type shown in FIG. 4, i.e. with stiffness that decreases as the deflection increases. In FIG. 4, as an example, the corresponding values of moulding pressure, obtainable for said configuration and arrangement of disk springs, for a tyre size of 225/50 R16, are shown on the right-hand ordinate. Owing to the softening characteristic of the elastic means and to the assigned preload, the elastic means 1 are operating in a zone of low stiffness that makes it possible to have small variations in the moulding pressure in relation to yields Δs sufficient to compensate the process tolerance in the volume of the green tyre 5. Again as an example, and referring to the size 225/50 R16, the external surface area of the crown portion (movable part) 2, for an internal support 25 composed of eight sectors, being of the order of 500 cm² for each sector, the maximum decrease $\Delta s_{max}$ necessary for absorbing the volume tolerances of the green tyre 5 is $2\delta_{volume}/(500 \text{ cm}^2 \times 8) = 0.5$ mm; assigning to the elastic means a preload corresponding to a deflection s of 1.5 mm (indicated with a dashed line in FIG. 4), the increase in deflection $\Delta s_{max}$ leads to a change in moulding pressure of 0.2 MPa.

Said internal toroidal support 25, carrying the crown portions (movable parts) 2, owing to the yielding of the elastic means 1, is suitable to absorb the mass/volume tolerances of the green tyre and so allows its moulding and vulcanization at controlled volume.

Advantageously, the moulding pressure can be guaranteed with the simultaneous and parallel action of elastic means 1 and of fluid under pressure delivered during the moulding/vulcanization stage into the hollow space between the crown portion (movable part) 2 and the supporting structure 7.

Figure 5B:
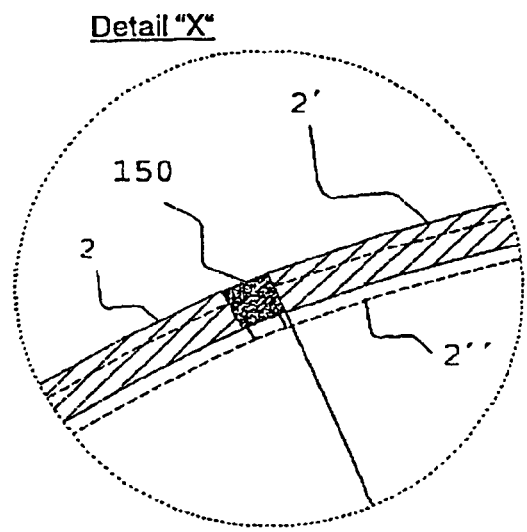
FIG. 5B shows detail of the contact zone of FIG. 5A between the movable crown portions in the two positions: nominal position and lower stop position.
Figure 5A:
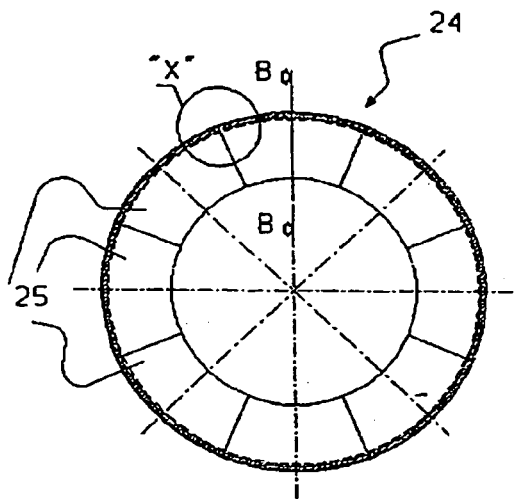
FIG. 5A shows schematically the view in equatorial section (i.e, in a plane perpendicular to the axial direction) of the internal toroidal support.

Preferably, the crown portions (movable parts) 2 of the multiple convex circumferential sectors that make up the internal support 25 are provided with gaskets 150 (see FIGS. 5A and 5B) that can be compressed in the circumferential direction to obviate the problems of co-penetration of solids that would otherwise occur on passing from position 2' to position 2" of the movable crown portion 2 (see FIG. 5B). Said gaskets 150 are glued or fixed mechanically to one of the two opposed surfaces of two contiguous crown portions 2.

Figure 6:
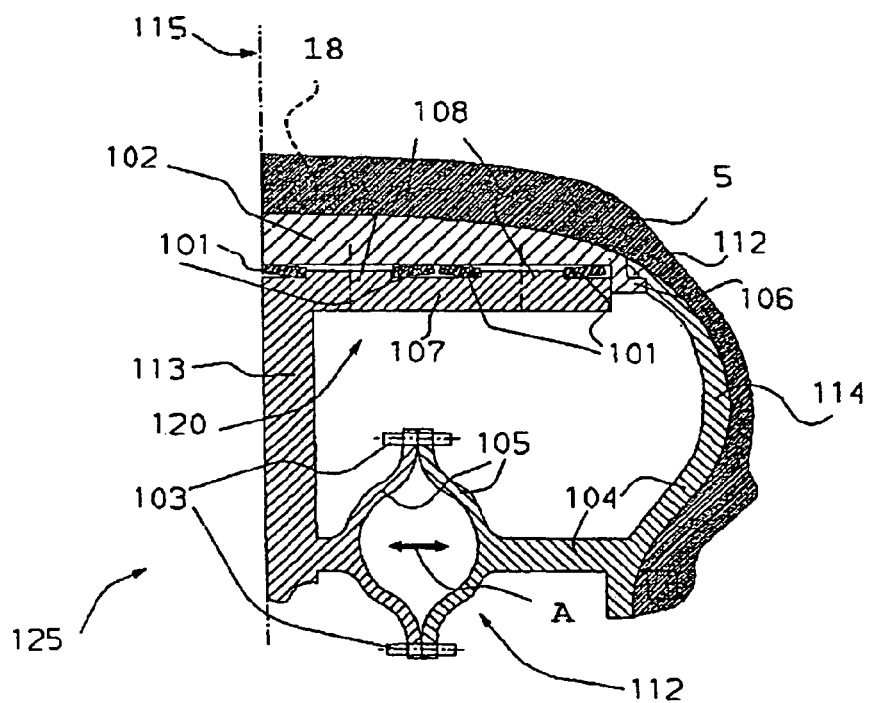
FIG. 6 shows a variant of the internal support of FIG. 2, in meridian section along line BB of FIG. 5.

FIG. 6 shows the meridian semi-section of a convex circumferential sector 125 which constitutes a variant of the convex circumferential sector 25 of FIG. 2. The sector 125 includes a base portion 104, radially internal, that is suitable to define the axially internal surface of the sidewalls of said tyre 5, and a cap 120, radially external, suitable to define the radially internal surface of the crown of said tyre 5, said cap 120 Including a supporting structure 107 provided with at least one central radial rib 113, and a crown portion (movable part) 102, radially external, movable in both ways in the radial direction relative to said parts 107 and 104, owing to the yielding of the elastic means 101 radially interposed between parts 107 and 102.

The supporting structure 107 is made integral with the base portion 104 in just the radial direction, but not in the axial direction, by means of arms 105, which are deformable in bending, joined by screws 103.

The deformable arms 105, joining the rib 113 to the cheeks 114 of the base portion 104, allows, by taking advantage of the elasticity of the materials, the relative movement in the axial direction indicated by the double arrow A. Said relative movement allows, if necessary, a compensation of the volume tolerance also on the sidewalls of the tyre: in the case there is an excess of volume in the sidewalls of tyre 5 in the moulding stage, the pressure on the cheeks 114 of the base portion 104 of each drum sector 125 can assume values such as to cause the arms 105 to bend and thus to permit the cheeks 114 to come closer to the equatorial plane of line 115, fitting to the volume of the hollow space between the outer annular cheeks 11 (a and b) and the inner cheeks 114 to the volume of the sidewalls of the green tyre 5.

According to further embodiment, the rib 113 and the base portion 104 can be joined by an "air spring", not shown/described as It is well known, that operates in the direction of the double arrow A and that can be calibrated so as to guarantee the nominal moulding pressure In case of either shortage or excess of volume of the sidewalls of tyre 5.

The crown portion 102 is provided with a stop 106, which by engaging with the appropriate profile 112 of the base portion, counteracts the preload of the elastic means 101.

Profiles 108, which act both as a guide for the elastic means 101, and as lower stop for the crown portion (movable part) 102, for the purpose of protecting said elastic means from excessive strains, are made in the supporting structure 107.

Figure 7:
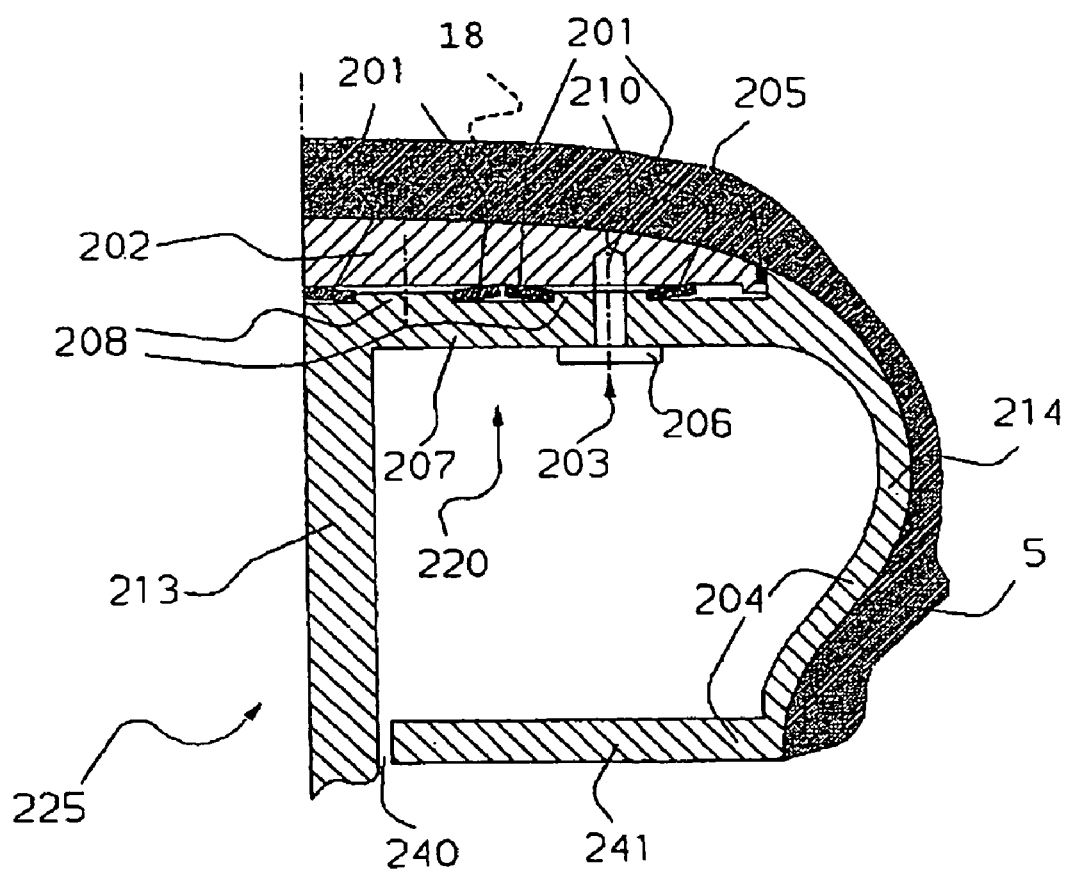
FIG. 7 shows a further embodiment of the internal support of FIG. 2, in meridian section along line BB of FIG. 5.

The convex circumferential sector 125 works in a manner similar to sector 25 of FIGS. 2-3. During the moulding stage, said crown portion (movable part) 102 moves owing to the yielding of said elastic means 101, adapting the volume of the hollow space between the internal support 125 and the external shell, made up of said cheeks 11 and said concave sectors 9, to the volume of the green tyre 5 (variable within the process tolerance), FIG. 7 shows the meridian semi-section of a convex circumferential sector 225 that constitutes a further embodiment of the convex circumferential sector 25 of FIG. 2. Sector 225 includes a base portion 204, suitable to define the axially internal surface of the sidewalls of said tyre 5, and a cap 220, radially external, suitable to define the radially internal surface of the crown of said tyre 5, said cap 220 including a supporting structure 207 provided with at least one central radial rib 213, and a crown portion (movable part) 202, radially external, movable in both radial directions relative to said parts 207 and 204, owing to the yielding of the elastic means 201 interposed radially between parts 207 and 202.

In contrast to the preceding embodiments, the base portion 204 and the supporting structure 207 are made as a single piece. The base structure 204 is joined to the radial rib 213 by an axial rib 241, dimensioned so as to leave a slot 240 that allow a relative movement of the internal cheeks 214 in respect of to the radial rib 213, equal at maximum to the opening of the slot 240. This relative movement allows the compensation of volume tolerances on the sidewalls of tyre 5 by exploiting the elastic flexural yielding of the internal cheeks 214.

The crown portion (movable part) 202 is joined to the supporting structure 207 by means of the elastic means 201 and of pins 203, said pins 203 being provided with a threaded end 210 engaged in the crown portion 202, and with a head 206 that acts as upper stop for the crown portion 202 and balances the preload of the elastic means 201. Said pins 203 allow controllable preloading of the elastic means 201 with the aid of the threaded end 210.

The profiles 208 that act both as guide for the elastic means 201, and as lower stop for the crown portion (movable part) 202, for the purpose of protecting said elastic means from excessive strains, are made in the supporting structure 207.

The inserts 205 act as "seal" for the compound of the green tyre 5 and, on mould closure, prevent the compound of the green tyre 5 from flowing into the clearance between the crown portion (movable part) 202 and the base portion 204, creating undesirable fins and/or seizing of the system. The inserts 205 are of elastomeric material or similar, glued (for example with epoxy resins) both to the crown portion (movable part) 202, and to the base portion 204. The inserts 205, when the crown portion (movable part) 202 is pushed towards lower levels, are deformed in shear, allowing the movement. Advantageously, the inserts 205 can be used in a similar manner and position in the convex circumferential sector 125 as well.

The sector embodiment 225 is very simple and is easy to assemble, since the crown portion 202 can be laid gently from above onto the bed of springs 201 and the preload is applied by acting on the threaded pin 203.

The invention claimed is:

1. A device for moulding and vulcanizing a tyre that is at least partially unvulcanized, comprising:
   an outer shell; and
   a collapsible inner support including a toroidal shape and a plurality of convex circumferential sectors;
   wherein each convex sector comprises a radially internal base portion and a radially external crown portion,
   wherein the crown portion includes at least two elastic elements along an axial direction of the crown portion such that the crown portion is elastically movable,
   wherein the moulding and vulcanizing comprise predetermined conditions of temperature and pressure,
   wherein the tyre comprises a defined volume,
   wherein the crown portions are interposed between the outer shell and the inner support,
   wherein the crown portions and outer shell form a cavity of controlled volume for the moulding and vulcanizing, and
   wherein the controlled volume of the cavity fits the defined volume of the tyre so that the moulding pressure is maintained within a predetermined range of values.

2. The device of claim 1, wherein the inner support further comprises:
   a toroidal shape,
   wherein the base portions define an axially internal surface of sidewalls of the tyre,
   wherein the crown portions define a radially internal surface of the tyre, and
   wherein, for each convex sector, the crown portion is movable in both radial directions relative to the base portion.

3. The device of claim 2, wherein for each convex sector, the crown portion is joined to the base portion so as to allow mutual movement of the crown and base portions in both radial directions.

4. The device of claim 1, wherein the crown portion comprises at least two stops that engage grooves of the base portion to oppose/balance forces due to a preloading of the elastic elements.

5. The device of claim 2, wherein the crown portions comprise a radially external profile matched to the radially internal surface of the tyre.

6. The device of claim 1, wherein a supporting structure of the inner support comprises profiles that act both as guides for the elastic elements and as lower stops for the crown portions.

7. The device of claim 1, wherein for each convex sector, the crown portion is connected to the base portion using at least one pin,
   wherein the at least one pin comprises a threaded end and a head that acts as upper stop for the crown portion, and
   wherein the at least one pin allows preloading of the elastic elements in a controllable manner.

8. The device of claim 1, wherein the elastic elements comprise disk springs.

9. The device of claim 2, wherein a supporting structure of the inner support is connected to inner cheeks of the base portions to allow relative movement of the inner cheeks in an axial direction.

10. The device of claim 2, wherein circumferentially contiguous crown portions comprise an insert of elastomeric material glued or fixed mechanically to a surface of a first crown portion opposed to a surface of a second crown portion.

11. The device of claim 2, wherein circumferentially contiguous base portions comprise an insert of elastomeric material glued or fixed mechanically to a surface of a first base portion opposed to a surface of a second base portion.

* * * * *